United States Patent [19]

Hankammer

[11] 4,306,971
[45] Dec. 22, 1981

[54] WATER PURIFYING APPARATUS

[75] Inventor: Heinz Hankammer, Taunusstein, Fed. Rep. of Germany

[73] Assignee: Chemie Brita Gerate Ing. Karl Itter Nachfolger, Taunusstein, Fed. Rep. of Germany

[21] Appl. No.: 150,584

[22] Filed: May 16, 1980

[30] Foreign Application Priority Data

May 17, 1979 [DE] Fed. Rep. of Germany ....... 2919901

[51] Int. Cl.³ ............................................. B01D 23/10
[52] U.S. Cl. ..................................... 210/282; 210/472
[58] Field of Search ............... 210/232, 238, 287, 289, 210/291, 436, 446, 451, 470, 472, 484, 282

[56] References Cited

U.S. PATENT DOCUMENTS

| | | | |
|---|---|---|---|
| 103,592 | 5/1870 | Farson | 210/472 |
| 1,524,547 | 1/1925 | Giacobbe | 210/472 |
| 2,630,227 | 3/1953 | Rodwell | 210/282 |
| 3,625,652 | 12/1971 | Fujimoto et al. | 210/282 |
| 3,747,767 | 7/1973 | Hankammer | 210/282 |

Primary Examiner—Ivars C. Cintins
Attorney, Agent, or Firm—Austin R. Miller

[57] ABSTRACT

An apparatus for purifying water, comprising a funnel-shaped member, a sleeve formed integrally with said member, a cup-shaped insert having a cylindrical wall arranged within the sleeve, screen-like closure members at upper and lower ends of the cylindrical wall of the insert, defining an accommodation chamber containing a granular purifying agent which is insoluble in water, the apertures in the screen-like closure members being smaller than the granules of the purifying agent, and a ventilation tube projecting upward and extending above the vertical height of the funnel-shaped member, provided at the top with openings, attached to the screen-like closure member at the upper end of the insert, said ventilation tube serving as a handle for said insert.

10 Claims, 7 Drawing Figures

Fig.4
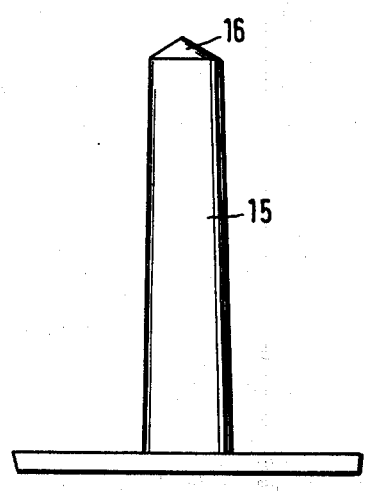
Fig.6
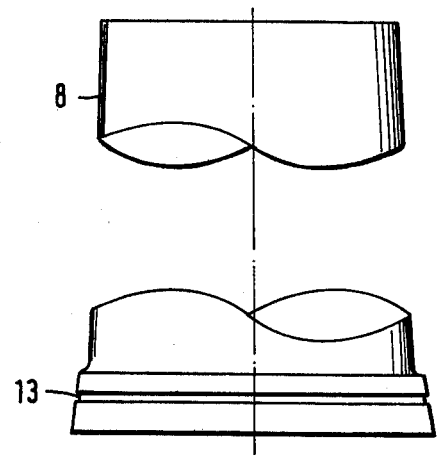
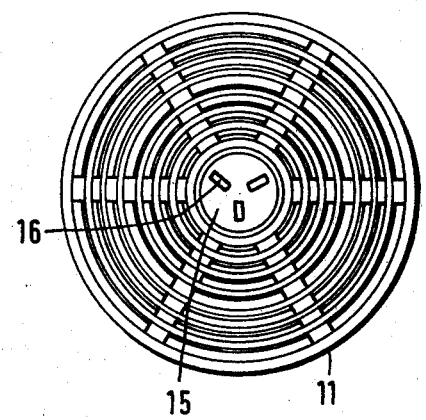
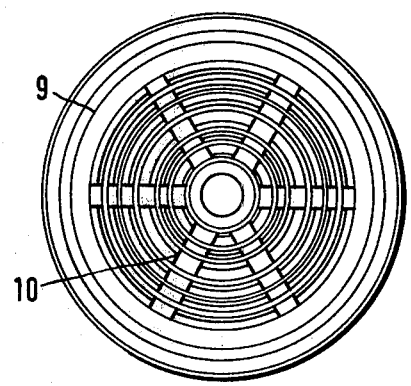
Fig.5
Fig.7

WATER PURIFYING APPARATUS

This invention relates to an apparatus for purifying water, the apparatus comprising a funnel-shaped member, a sleeve, and a screen-like closure member, at each end, defining a chamber for the accommodation of a granular purifying agent which is insoluble in water, the apertures therein being smaller than the granules of the purifying agent.

In a known water-purifying apparatus of the kind mentioned above the sleeve is detachably connected to the funnel-shaped member. The latter is made of a resilient material and has a connector with an inwardly-directed annular flange which cooperates with an outwardly-directed annular flange on the sleeve, and which if correctly fitted, makes a liquid-tight joint. It has been found, however, that the final consumer sometimes lacks the skill to insert the sleeve truly coaxially into the grid-like part, and the resulting tilt produces leakage.

Water-purifying apparatus is also known in which the sleeve is integral with the funnel-shaped member. In such apparatus, one of the screen-like closure members is located at the bottom of the sleeve, whereas the other is delivered loose and is placed on the upper end after the sleeve has been filled with the granular purifying agent. The correct purifying agent supplied for the apparatus is rendered substantially germ-free by a surface-treatment, e.g. by silver-plating the surface of the activated charcoal. The ultimate consumer, however, often uses purifying agents which are subjected to partial surface-treatment or no surface-treatment at all. Thus when the purifying agent is being placed in the sleeve, unwanted germs may be carried in with the loose granules.

It is an object of the present invention to provide an improved water-purifying apparatus of the type mentioned above which will achieve a maximum of hygiene, especially as regards elimination of unwanted germs, and an improvement in sealing.

According to the invention, this object is achieved by forming the sleeve integrally with the funnel-shaped member, and arranging in the sleeve a removable insert to the ends of which are fitted the screen-like closure members. In spite of the difficulties sometimes associated with the known apparatus described above, the sleeve is formed integrally with the funnel-shaped member in order to improve sealing, and, on the other hand, hygiene is improved by accommodating the granular purifying agent in an insert which may be removed from the sleeve.

Thus the ultimate consumer no longer comes into direct contact with the purifying agent, and this greatly reduces the introduction of germs into the loose mass, especially if the charge still contains small untreated surfaces; this has the advantage of allowing the manufacturer to fill the unit with the correct purifying agent which is wholly, or at least largely, surface-treated, instead of leaving it to the ultimate consumer to select the type of purifying agent he wishes to use for filtering.

According to an advantageous configuration of the invention, an upwardly-projecting vent-pipe provided with apertures is fitted to the screen-like closure member at the upper end of the insert, while the funnel-shaped member has projections or recesses at its upper edge. It has been found, on occasion, that without these arrangements clogging of the screen-like apertures in the closure member may take place, with the result that the flow of water through the area filled with purifying agent and defined by the screen-like closure members is slowed down quite considerably. Thus if the vent-pipe, which may advantageously be made in the form of a grip for better handling of the upper closure member, is fitted to the upper closure member, with the apertures preferably at the top above the level of the liquid, clogging of the small screen apertures is prevented and the liquid passes more easily therethrough. Actually, a small vacuum could develop in the funnel-shaped member if a cover is fitted thereto, as supplied commercially with the apparatus described. If, however, as indicated above, projections, i.e. small protuberances, extensions, or knobs and/or recesses, i.e. grooves, corrugations or flutes, are provided at the top edge of the funnel-shaped member and, if necessary, in the cover, this definitely prevents the formation of a vacuum and ensures a fast flow of liquid through the purifying agent.

According to the invention, sealing is further improved by providing the insert with an external, peripheral, groove-like or bead-like sealing means.

According to the invention, retention of the insert may be ensured expediently and simply by means of a stop formed integrally with the lower end of the sleeve. This stop may be, for example, in the form of a stop projecting downwardly and inwardly from the inner periphery of the sleeve, or of a cruciform support.

It is also desirable for the upper end of the sleeve to be expanded to form a support. This support is preferably stepped, the expansion being arranged at the transition between the sleeve and funnel-shaped member.

It is furthermore desirable for the insert to be in the form of a cup, the outer walls thereof being arranged approximately coaxially with the inner wall of the sleeve. This permits optimal utilization of the available space, so that the insert, which may be in the form of a cartridge, will contain sufficient purifying agent. For example, if it is assumed that between 1 and 2 liters of water are purified daily, i.e. that this is the amount flowing through the granular purifying compound, then the amount of purifying agent supplied by the manufacturer will be sufficient for about one month. Thus the ultimate consumer will discard the used insert, and replace it with a new one, every month. If the cartridge-like insert according to the invention is made of an inexpensive synthetic material, then the difference in price, as compared with the shapeless plastic bags full of purifying agent now on the market, is negligible. In fact the insert may cost the same, or even less, if the amount of purifying agent spilled during refilling is taken into account. Furthermore, as indicated above, the insert prevents the ultimate consumer from using the wrong purifying agent.

Further advantages, characteristics and possible applications of the present invention may be gathered from the following description, in conjunction with the drawings attached hereto, wherein:

FIG. 4 is a side elevation of the upper, screen-like closure part with the vent-pipe in place;

FIG. 5 is a plan view of FIG. 4;

FIG. 6 is a side elevation, broken away, of the cup-like insert, and

FIG. 7 is a view of the insert from below, with the lower screen-like closure member.

Figure 1:
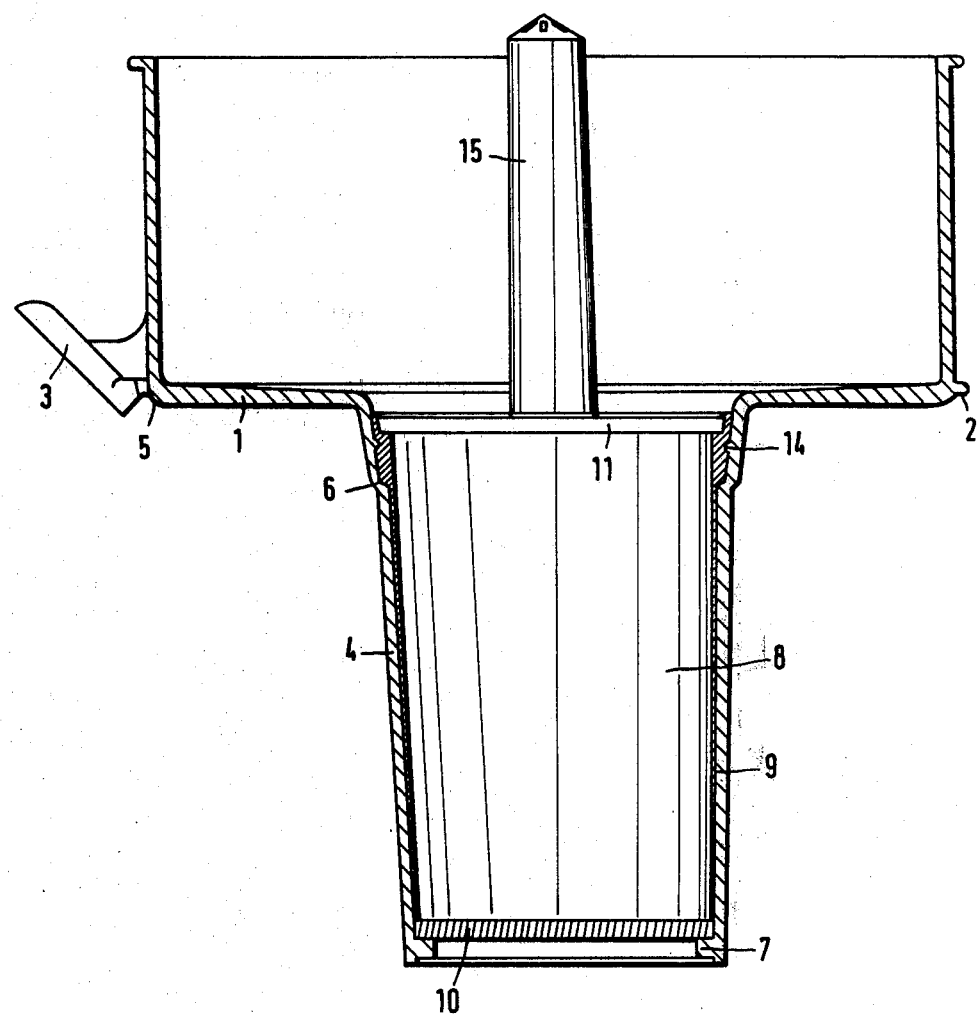
FIG. 1 shows a section through a water-purifying apparatus according to the invention, with a cartridge-like insert in the sleeve.

The funnel-shaped member 1 shown in FIG. 1 has an external flange 2, which rests upon the edge of a container, and an obliquely set lug 3 which allows the member 1 to be hinged upwardly, with an integral sleeve 4, about the centre of rotation indicated with a cross in the vicinity of 5. This makes it possible to pour out the purified liquid with the funnel still in place on the container.

The sleeve 4, formed integrally and centrally with the bottom of the funnel-shaped member 1, has a stepped support 6 at the top at the transition between them formed by expansion. In the illustrated embodiment, the sleeve tapers slightly in the downward direction, the lower end having a short edge 7 projecting inwardly for a few millimeters and extending around the entire internal periphery. It is also conceivable to use only a few stops or projections, or even a cruciform supporting surface, the four quadrants thereof being in the form of large apertures through which the purified liquid may flow into a container located under them.

Figure 2:
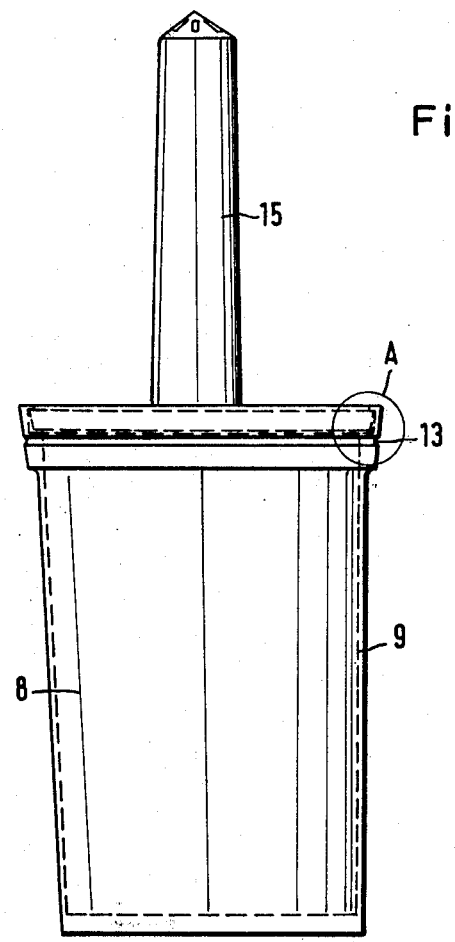
FIG. 2 shows the insert removed from the sleeve.

This liquid emerges from the granular purifying agent (not shown), which is insoluble in water and, which is contained in a cup-like insert 8 shown in FIGS. 1 and 2. This insert consists essentially of an approximately cylindrical wall 9, a lower screen-like closure member 10 and an upper screen-like closure member 11. The lower member 10 may be formed integrally with the wall 9, or it may be separate and secured to the bottom by clamping, snapping-in, or the like. The upper closure member 11 is preferably snapped into the groove 12, in the manner shown in FIG. 3.

Figure 3:
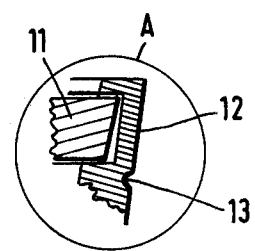
FIG. 3 shows on an enlarged scale the part circled and marked A in FIG. 2, in cross-section and broken away.

As shown in FIGS. 2,3 and 6, the insert 8 has at the top a sealing groove 13. An annular bead 14 arranged in the expanded part at the top of the sleeve 4 (FIG. 1), snaps into the groove. FIG. 7, which is a view of the insert 8 from below, shows the lower screen-like closure member 10, and also the wall 9 of the insert, which is approximately cylindrical and tapers slightly downwards, the outer edge projecting farthest to the outside. It will be seen that the diameter of the closure member 10 is smaller than that of the closure member 11, shown in FIG. 5. Formed centrally in the latter is an upwardly-projecting vent-pipe 15, the upper part of which has vent-apertures 16. It will be understood that the ultimate consumer may also use the vent-pipe 15 as a grip for handling the insert 8 as a whole.

I claim:

1. An apparatus for purifying water, said apparatus comprising a funnel-shaped member, a sleeve formed integrally with said member, a cup-shaped insert having a cylindrical wall arranged within the sleeve, screen-like closure members at upper and lower ends of the cylindrical wall of the insert, defining an accommodation chamber containing a granular purifying agent which is insoluble in water, the apertures in the screen-like closure members being smaller than the granules of the purifying agent, and a ventilation tube projecting upward and extending above the vertical height of the funnel-shaped member, provided at the top with openings, attached to the screen-like closure member at the upper end of the insert said ventilation tube serving as a handle for said insert.

2. An apparatus according to claim 1, wherein the funnel-shaped member has projections at its upper edge.

3. An apparatus according to claim 1, wherein the insert has a sealing device running around its periphery.

4. An apparatus according to claim 1 wherein a stop is formed integrally with the lower end of the sleeve.

5. An apparatus according to claim 1 wherein the sleeve is expanded at its upper end to form a support.

6. An apparatus according to claim 1 wherein the insert is in the form of a cup, the outer cup walls thereof being arranged approximately coaxially with the inner wall of the sleeve.

7. An apparatus according to claim 1 wherein said lower screen-like closure member of said cup-shaped insert is formed integrally with said cup wall.

8. An apparatus according to claim 1 wherein said lower screen-like closure member of the cup-shaped insert is fastened to the walls thereof by means of clamps.

9. An apparatus according to claim 1 wherein the funnel-shaped member has recesses at its upper edge.

10. An apparatus for purifying water, said apparatus comprising:
   (a) a funnel-shaped member;
   (b) a sleeve integrally formed with said funnel-shaped member;
   (c) an annular bead on the inner wall of said sleeve positioned near said funnel-shaped member;
   (d) a cylindrical member slidably insertable into said sleeve, said cylindrical member further comprising:
      (i) a cylindrical accommodation chamber containing a granular purifying agent which is insoluble in water;
      (ii) screen-like closure members, at upper and lower ends of said accommodation chamber, the apertures therein being smaller than the granules of the purifying agent, whereby said granular purifying agent is held in said accommodation chamber;
      (iii) a ventilation tube projecting upward and extending above the vertical height of the funnel-shaped member, provided at the top with openings, attached to said screen-like closure member at the upper end of said accommodation chamber, said ventilation tube serving as a handle for said cylindrical member;
      (iv) an annular sealing groove at the upper end of the outer wall of said accommodation chamber whereby said cylindrical member is secured to said sleeve at said annular bead.

* * * * *